(12) United States Patent
Deyama et al.

(10) Patent No.: US 8,872,864 B2
(45) Date of Patent: Oct. 28, 2014

(54) DISPLAY DEVICE, DISPLAY SYSTEM, AND CORRECTION METHOD

(75) Inventors: Atsuyoshi Deyama, Hakusan (JP);
Junro Yonemitsu, Hakusan (JP);
Kensuke Nagashima, Hakusan (JP);
Takafumi Kawakami, Hakusan (JP)

(73) Assignee: Eizo Nanao Corporation, Hakusan-Shi (JP)

( * ) Notice: Subject to any disclaimer, the term of this patent is extended or adjusted under 35 U.S.C. 154(b) by 155 days.

(21) Appl. No.: 13/264,616

(22) PCT Filed: Apr. 12, 2010

(86) PCT No.: PCT/JP2010/056543
§ 371 (c)(1),
(2), (4) Date: Oct. 14, 2011

(87) PCT Pub. No.: WO2010/119845
PCT Pub. Date: Oct. 21, 2010

(65) Prior Publication Data
US 2012/0038688 A1 Feb. 16, 2012

(30) Foreign Application Priority Data
Apr. 15, 2009 (JP) ................................ 2009-099152

(51) Int. Cl.
*G09G 5/10* (2006.01)
*G09G 5/00* (2006.01)
*G06F 3/038* (2013.01)
*G09G 3/36* (2006.01)
*G09G 5/02* (2006.01)
*H04N 1/60* (2006.01)

(52) U.S. Cl.
CPC ..... *H04N 1/6033* (2013.01); *G09G 2320/0666* (2013.01); *G09G 2320/0626* (2013.01); *G09G 2320/0693* (2013.01); *G09G 5/10* (2013.01); *G09G 5/02* (2013.01)

USPC ................ 345/690; 345/208; 345/87; 345/88

(58) Field of Classification Search
USPC .................... 345/690, 208, 87–104
See application file for complete search history.

(56) References Cited

U.S. PATENT DOCUMENTS 6,188,380 B1 2/2001 Kawashima et al.
6,504,950 B1 1/2003 Murashita et al.
(Continued)

FOREIGN PATENT DOCUMENTS

DE 10359987 A1 7/2005
DE 102004062272 A1 7/2006
(Continued)

OTHER PUBLICATIONS

Extended European Search Report, issued in corresponding European Patent Application No. EP 10764429.6, dated Dec. 14, 2012.
(Continued)

*Primary Examiner* — Ilana Spar
(74) *Attorney, Agent, or Firm* — Edwards Wildman Palmer LLP; David G. Conlin; Christopher J. Capelli

(57) ABSTRACT

A control unit performs calibration when a determining unit determines that an absence condition of an operator is satisfied. Calibration is performed to a whole or part of brightness, a white point (gain), gamma (gradation), and primary colors (red, blue, and green colors). The control unit stores a correction amount by calibration in a storage unit, measures the (corrected) calibrated brightness or color tone by using an optical sensor, and stores the measured final measurement result in the storage unit as a corrected measurement value. After performing calibration or when the determining unit determines that a presence condition of the operator is satisfied, a profile generating unit generates color space information.

10 Claims, 16 Drawing Sheets

(56) References Cited

U.S. PATENT DOCUMENTS

| | | | |
|---|---|---|---|
| 7,519,703 B1 * | 4/2009 | Stuart et al. | 709/224 |
| 7,893,951 B2 * | 2/2011 | Narui et al. | 345/698 |
| 2005/0190136 A1 | 9/2005 | Edelbrock | |
| 2006/0181552 A1 | 8/2006 | Hopple | |
| 2007/0091114 A1 | 4/2007 | Kwak et al. | |
| 2007/0242064 A1 | 10/2007 | Kuo | |
| 2009/0086089 A1 * | 4/2009 | Matsui et al. | 348/441 |

FOREIGN PATENT DOCUMENTS

| | | | |
|---|---|---|---|
| GB | 2431276 A | | 4/2007 |
| JP | 61-095387 A | | 5/1986 |
| JP | S62-139579 A | | 6/1987 |
| JP | 02-135491 A | | 5/1990 |
| JP | 05-083660 A | | 4/1993 |
| JP | 05083660 A | * | 4/1993 |
| JP | 09-084038 A | | 3/1997 |
| JP | H10-222129 A | | 8/1998 |
| JP | H11-338443 A | | 12/1999 |
| JP | 2000-059806 A | | 2/2000 |
| JP | 2000-284773 A | | 10/2000 |
| JP | 3171808 B | | 6/2001 |
| JP | 3193315 B | | 7/2001 |
| JP | 2002-055668 A | | 2/2002 |
| JP | 2007-34209 A | | 2/2007 |
| JP | 2008-129334 A | | 6/2008 |
| JP | 2008-165083 A | | 7/2008 |
| JP | 2008-181044 A | | 8/2008 |

OTHER PUBLICATIONS

EIZO Sensor Solutions for Medical Monitors—Blacklight Sensor/External Sensor/Swing Sensor, White Paper, No. 07-002 Revision A, Jun. 2007.

Eizo Nanao Corporation, Promotion Department CR Promotion Division, "Iyo Gazo Hyoji Monitor RadiForveRG33/R31 ShinHatsubai, Monitor Hinshitsu Kanri Tool Clip-On Swing Sensor G1 Doji Hatsubai.", News Release, No. NR05-014 Rev. A, Jun. 16, 2005.

Eizo Nanao Corporation, Planning Department, Promotion Division, "Shin Sedai no Denshi Karte Gazo Hyoji Monitor RadiForce MX Series 7 Kishu to Monitor Hinshitsu Kanri Tool o Hatsubai", News Release, No. NR09-018 Rev. A, Oct. 1, 2009.

Eizo Nanao Corporation, Planning Department, Promotion Division, Gashitsu no Iji Kanri o Yoi ni suru, Calibration Sensor Naizogata Ekisho Monitor o Hatsubai, News Release, No. NR10-008 Rev. A, Feb. 25, 2010.

* cited by examiner

FIG. 2

| | | |
|---|---|---|
| ABSENCE CONDITION OF THE OPERATOR (THE FIRST CONDITION) | -HUMAN SENSOR SENSES ABSENCE OF PERSON | -PC OFF<br>-DISPLAY DEVICE OFF<br>-NO SIGNAL FROM PC DURING PREDETERMINED TIME | -TIME TO LEAVE OFFICE<br>-TIME TO LEAVE ROOM<br>-SATURDAY, SUNDAY |
| PRESENCE CONDITION OF THE OPERATOR (THE SECOND CONDITION) | -HUMAN SENSOR SENSES PRESENCE OF PERSON | -PC ON<br>-DISPLAY DEVICE ON<br>-SIGNAL FROM PC AFTER A STATE OF NO SIGNAL FROM PC FOR PREDETERMINED TIME | -TIME TO COME OFFICE<br>-TIME TO ENTER ROOM<br>-MONDAY |

FIG. 12

| ICC PROFILE | | | |
|---|---|---|---|
| HEADER INFORMATION | TAG TABLE | | |
| | # TAG | OFFSET | SIZE |
| | 0 desc | | |
| | 1 cprt | | |
| | 2 rXYZ | | |
| | 3 gXYZ | | |
| | 4 bXYZ | | |
| | 5 rTRC | | |
| | 6 gTRC | | |
| | 7 bTRC | | |
| | 8 wtpt | | |
| | 9 chad | | |
| | 10 lumi | | |

F I G. 1 3

| WHEN D50 IS WHITE POINT | X | Y | Z |
|---|---|---|---|
| R (rXYZ) | 0.59848 | 0.28793 | 0.01134 |
| G (gXYZ) | 0.23421 | 0.65628 | 0.16232 |
| B (bXYZ) | 0.13179 | 0.05493 | 0.65041 |
| W (wtpt) | 0.9642 | 1 | 0.82491 |

F I G. 1 4 A

MATRIX OF chad TAG

| 1.04715 | 0.022522 | -0.05008 |
|---|---|---|
| 0.028976 | 0.990952 | -0.017 |
| -0.00925 | 0.015121 | 0.751572 |

F I G. 1 4 B

INVERSE MATRIX OF chad TAG

| 0.956159 | -0.0227 | 0.063198 |
|---|---|---|
| -0.02775 | 1.009441 | 0.020981 |
| 0.012322 | -0.02059 | 1.3309 |

FIG. 15

| WHEN MEASURED WHITE IS WHITE POINT | X | Y | Z |
|---|---|---|---|
| R (rXYZ) | 0.566424 | 0.27428 | 0.016539 |
| G (gXYZ) | 0.219306 | 0.659383 | 0.205406 |
| B (bXYZ) | 0.16587 | 0.065438 | 0.866124 |
| W (wtpt) | 0.990873 | 0.999995 | 1.089166 |

DISPLAY DEVICE, DISPLAY SYSTEM, AND CORRECTION METHOD

This application is the national phase under 35 U.S.C. §371 of PCT International Application No. PCT/JP2010/056543 which has an International filing date of Apr. 12, 2010 and designated the United States of America.

BACKGROUND

1. Technical Field

The present invention relates to a display device and a display system capable of correcting brightness or a color tone and generating color space information, and a correction method by the display device.

2. Description of Related Art

In a printing industry, a design industry, and the like, various operations are performed by using a display device including a monitor such as a liquid-crystal display panel. However, since an operator performs various operations by using intrinsic devices (such as a monitor of a display device, and a printer) and application software respectively, colors of images reproduced by the display device and the application software may sometimes be different.
Consequently, color management which takes into account reproducibility of colors between different devices and applications becomes important.

When an image is viewed through a display device, the same image may sometimes look like a different image each time when the image is viewed, if the brightness and the color tone of the monitor are different each time.

Therefore, in the color management, it is also important to perform calibration such that the brightness and the color tone of the monitor are periodically adjusted.

Conventionally, when calibration of a display device (monitor) is performed, for example, a method has been used in which, application software for calibration is started by a personal computer (PC) connected to the display device, target values of brightness and a color tone are determined, and thereafter, calibration is performed to adjust the monitor.

For a circuit to be adjusted having many adjustment items, there is disclosed an automatic adjusting circuit of an electronic device that generates primary control data to obtain a characteristic set in advance by an external adjusting loop, and thereafter, corrects the primary control data by an internal adjusting loop. The automatic adjusting circuit is designed such that, when performing calibration, the operator detects an output characteristic of a liquid crystal panel with an internal sensor after external adjustment by an external sensor, and thereafter, performs a fine adjustment of the control data according to an error between internal reference data and a detected result (e.g., Japanese Patent Application Laid-Open No. H5-83660).

However, according to the conventional method and the method in Japanese Patent Application Laid-Open No. H5-83660, the operator is required to perform an adjustment operation near a monitor while calibration is being performed, and this becomes a load to the operator. Calibration not only requires adjustment of the monitor but also generation of color space information adapted to a display characteristic after the adjustment, and the operator is restrained during this period. The color space information is information used for color management, such as an ICC profile, a WCS profile, and the like, to achieve reproducibility of colors between different devices and applications.

SUMMARY

The present invention has been made in view of the above circumstances, and an object thereof is to provide a display device and a display system capable of correcting brightness or a color tone and generating color space information not based on presence of an operator, and a correction method by the display device.

A first aspect of the invention is directed to a display device including a display unit, and a correcting unit that corrects brightness or a color tone of the display unit, the display device further including a measuring unit that measures the brightness or the color tone of the display unit, a difference calculating unit that calculates a difference between a measurement value measured by the measuring unit and a predetermined target value, a correction-amount calculating unit that calculates a correction amount to correct the brightness or the color tone of the display unit based on the difference calculated by the difference calculating unit, a first determining unit that determines establishment of a condition that an operator is absent, and a second determining unit that determines establishment of a condition that the operator is present, wherein the correcting unit corrects the brightness or the color tone by using a correction amount calculated by the correction-amount calculating unit when the first determining unit determines that the condition that the operator is absent is established, and includes a storage unit that stores a corrected measurement value of the brightness or the color tone measured by the measuring unit after the correcting unit corrects the brightness or the color tone, and an output unit that outputs the corrected measurement value stored in the storage unit to an external device according to reading from the external device that generates color space information concerning color management for achieving reproducibility of colors based on the corrected measurement value, when the second determining unit determines that the condition that the operator is present is established.

According to a second aspect of the invention, the display device according to the first aspect includes a target-value calculating unit that calculates the target value from arbitrary color space information concerning the color management for achieving the reproducibility of colors.

According to a third aspect of the invention, the display device according to the first or second aspect includes a human sensor, wherein the first determining unit is configured to determine that the condition that the operator is absent is established when the human sensor does not sense a person, and the second determining unit is configured to determine that the condition that the operator is present is established when the human sensor senses a person.

According to an fourth aspect of the invention, the display device according to the first or second aspect includes an obtaining unit that obtains a predetermined signal from the external device, wherein the first determining unit is configured to determine that the condition that the operator is absent is established when the obtaining unit does not obtain the predetermined signal, and the second determining unit is configured to determine that the condition that the operator is present is established when the obtaining unit obtains the predetermined signal.

According to a fifth aspect of the invention, the display device according to the first or second aspect includes a timing unit, wherein the first determining unit is configured to determine that the condition that the operator is absent is established when time is a predetermined first time point, and the second determining unit is configured to determine that the condition that the operator is present is established when time is a predetermined second time point.

According to a sixth aspect of the invention, the display system includes the display device according to any one of the above aspects, and an external device that outputs predetermined data to the display device, wherein the external device includes a generating unit that generates color space information concerning color management for achieving reproducibility of colors based on the corrected measurement value that is read, when the second determining unit of the display device determines that the condition that the operator is present is established.

A seventh aspect of the invention is directed to a correction method for correcting brightness or a color tone of a display unit of a display device that includes the display unit, the method including determining establishment of a condition that an operator is absent by a first determining unit, measuring brightness or a color tone of the display unit by a measuring unit when determined that the condition that the operator is absent is established, calculating a difference between a measurement value and a predetermined target value by a difference calculating unit, calculating a correction amount to correct the brightness or the color tone of the display unit based on the calculated difference by a correction-amount calculating unit, correcting the brightness or the color tone by using the calculated correction amount by a correcting unit, storing, in a storing unit, a corrected measurement value of the brightness or the color tone measured by the measuring unit after correcting the brightness or the color tone by the correcting unit, determining establishment of a condition that the operator is present by a second determining unit, and outputting the corrected measurement value stored in the storage unit to an external device according to reading from the external device that generates color space information concerning color management for achieving reproducibility of colors based on the corrected measurement value, when determined that the condition that the operator is present is established.

In the first and seventh aspects, the first determining unit determines establishment of the condition that the operator is absent. The condition that the operator is absent can be a performance condition that indicates a timing of performing correction (calibration) of brightness and a color tone. When it is determined that the condition that the operator is absent is established, the measuring unit measures brightness or a color tone of the display unit (monitor). The color tone is a characteristic important for reproducibility of colors such as a white point, a black level, primary colors, color temperatures, and gamma (gradation), for example. The difference calculating unit calculates a difference between a measurement value of brightness and a color tone and a predetermined target value, the correction-amount calculating unit calculates a correction amount to correct brightness or a color tone of the display unit based on the calculated difference, and the correcting unit corrects brightness or a color tone by using the calculated correction amount. After correction, a corrected measurement value of brightness or a color tone measured by the measuring unit is stored in the storage unit. The second determining unit determines establishment of the condition that the operator is present. When it is determined that the condition that the operator is present is established, the corrected measurement value stored in the storage unit is output to the external device according to reading from the external device that generates color space information concerning color management for achieving reproducibility of colors based on the corrected measurement value stored in the storage unit. With this arrangement, correction (calibration) of brightness or a color tone can be performed when the operator is absent, and the corrected measurement value of brightness or a color tone measured after correction can be stored. Accordingly, a load of the operator can be reduced. When it is determined that the condition that the operator is present is established, the corrected measurement value measured after correction is output to the external device. Therefore, the operator is not required to perform measurement by themselves after correction (calibration), and can use the corrected measurement value immediately after the operator is present. Consequently, when the operator is absent, data necessary to generate color space information such as an ICC profile can be obtained in advance.

In the sixth aspect, when it is determined that the condition that the operator is present is established the generating unit generates color space information concerning color management for achieving reproducibility of colors based on the corrected measurement value stored in the storage unit. The color space information is information of a color space held by individual devices such as a monitor, and is an ICC profile of the ICC (International Color Consortium) standard, for example. With this arrangement, when the operator is present, the operator can generate the color space information based on a measurement value after calibration that is performed while the operator is absent.

In the second aspect, a predetermined target value is calculated from color space information. The predetermined target value is brightness and a color tone, and the color tone is a characteristic important for reproducibility of colors such as a white point, a black level, primary colors, color temperatures, and gamma (gradation), for example. The color space information can be generated in advance, and the target value can be obtained from existing color space information. Therefore, the operator is not required to perform an input operation to set the target value. Colors of other display devices and other systems can be reproduced by emulation. Further, a state of a display device (display unit) can be always maintained in a state corresponding to color space information, based on a target value obtained from the color space information.

In the third aspect, the display device includes a human sensor. The first determining unit determines that the condition that the operator is absent is established when the human sensor does not sense a person, and the second determining unit determines that the condition that the operator is present is established when the human sensor senses a person. With this arrangement, when a person is not sensed, it can be determined that the operator is absent, and when a person is sensed, it can be determined that the operator is present. Calibration can be performed and the calibrated measurement value can be stored, when the operator is absent. An ICC profile can be generated by using the calibrated data, when the operator is present.

In the fourth aspect, the display device includes the obtaining unit that obtains a predetermined signal from the external device (e.g., personal computer). The predetermined signal is a signal indicating that a personal computer is operating, for example. The first determining unit determines that the condition that the operator is absent is established when the predetermined signal is not obtained, and the second determining unit determines that the condition that the operator is present is established when the predetermined signal is obtained. With this arrangement, it can be determined that the operator is absent when the operator is not operating the personal computer, and it can be determined that the operator is present when the operator is operating the personal computer. Calibration can be performed and the calibrated measurement value can be stored, when the operator is absent. An ICC profile can be generated by using the calibrated data, when the operator is present.

In the fifth aspect, the display device includes the timing unit. The first determining unit determines that the condition that the operator is absent is established when time is a predetermined first time point (e.g., scheduled time to leave the office or scheduled time to leave the room), and the second determining unit determines that the condition that the operator is present is established when time is a predetermined second time point (e.g., scheduled time to come to the office or scheduled time to enter the room). With this arrangement, it can be determined that the operator is absent at the scheduled time to leave the office or the scheduled time to leave the room, and it can be determined that the operator is present at the scheduled time to come to the office or the scheduled time to enter the room. Calibration can be performed and the calibrated measurement value can be stored, when the operator is absent. An ICC profile can be generated by using the calibrated data, when the operator is present.

According to the present invention, correction (calibration) not based on presence of the operator can be performed, color space information can be generated, and a load of the operator can be reduced.

The above and further objects and features of the invention will more fully be apparent from the following detailed description with accompanying drawings.

BRIEF DESCRIPTION OF THE SEVERAL VIEWS OF THE DRAWINGS

FIG. 2 is an explanatory diagram showing an example of an absence condition and a presence condition of an operator;

FIG. 12 is an explanatory diagram showing an example of an ICC profile;

FIG. 13 is an explanatory diagram showing an example of a standardized tristimulus value when D50 is a white point;

FIG. 14A is an explanatory diagram showing an example of a matrix shown in a chad tag;

FIG. 14B is an explanatory diagram showing an example of a matrix shown in a chad tag;

FIG. 15 is an explanatory diagram showing an example of a standardized tristimulus value when a tristimulus value in a wtpt tag is a white point.

DETAILED DESCRIPTION

First Embodiment

Figure 1:
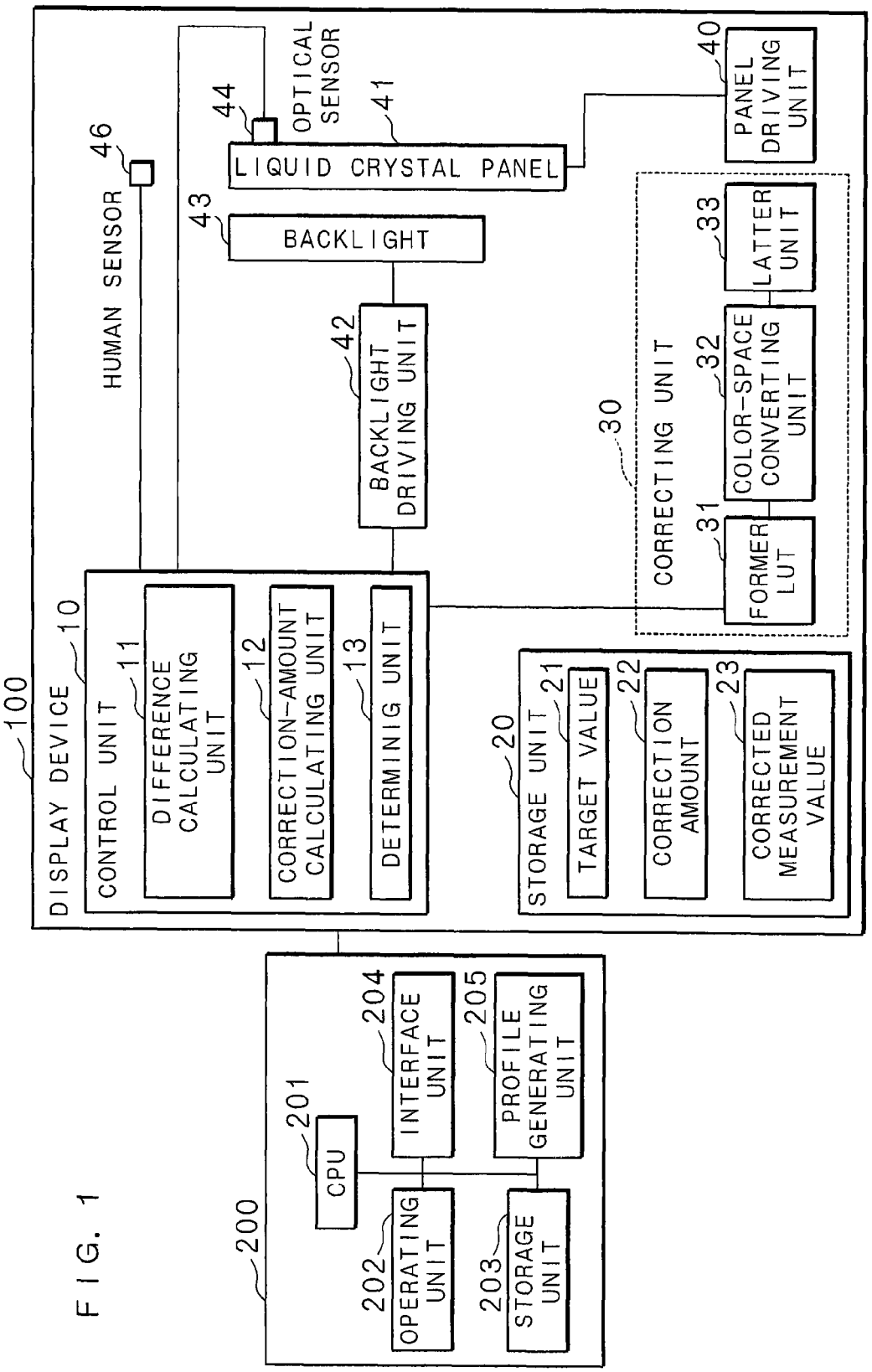
FIG. 1 is a block diagram showing an example of a configuration of a display system according to the present invention.

The present invention is described below with reference to the drawings showing embodiments. FIG. 1 is a block diagram showing an example of a configuration of a display system according to the present invention. The display system includes a display device 100, a personal computer (PC) 200 as an external output device, and the like, and the display device 100 and the PC 200 are connected to each other with a predetermined interface cable.

The display device 100 includes a control unit 10 as a timing unit and as an obtaining unit that obtains a predetermined signal from the outside, a storage unit 20, a correcting unit 30 as a correcting unit that corrects a color tone, a panel driving unit 40, and a liquid crystal panel 41 as a display unit, a backlight 43, a backlight driving unit 42, an optical sensor 44 as a measuring unit of brightness or a color tone, and a human sensor 46 that senses whether a person is around. The color tone is a characteristic important for reproducibility of colors such as a white point, a black level, primary colors, color temperatures, and gamma (gradation), for example.

The control unit 10 includes a difference calculating unit 11 that calculates a difference between a measurement value and a predetermined target value, a correction-amount calculating unit 12 that calculates a correction amount to correct a color tone of the liquid crystal panel 41 based on the difference, a determining unit 13 that determines establishment of a predetermined first condition or a predetermined second condition, and the like.

The storage unit 20 stores a target value 21 of correction (calibration), a correction amount 22 calculated by the correction-amount calculating unit 12, and a corrected measurement value 23 measured by the optical sensor 44 after calibration. The corrected measurement value 23 is a tristimulus value (X, Y, Z) of white, black, and primary colors (red, green, blue), respectively, and the like, for example.

The correcting unit 30 includes a former LUT (lookup table) 31, a color-space converting unit 32, a latter LUT (lookup table) 33, and the like.

The PC 200 includes a CPU 201, an operating unit 202, a storage unit 203, an interface unit 204, a profile generating unit 205 as a generating unit that generates color space information based on the corrected measurement value 23, and the like. The color space information is information of a color space held by individual devices such as a monitor, and is an ICC profile of the ICC (International Color Consortium) standard, for example. Generated color space information is not limited to the ICC profile, and can be color space information of other format such as a WCS profile.

The PC 200 can output an image to be displayed by the display device 100 to the former LUT 31 as a video signal, via the interface unit 204. The video signal can be either in an analog signal format or in a digital signal format.

The former LUT 31 has an input gradation configured by 8 bits, and stores an output gradation (output value) expressed by 14 bits, for example, in 256 entries corresponding to 256 gradations from 0 to 255, respectively. The former LUT 31 is configured such that a user can set a gradation characteristic (for example, a user can set a gamma value), and a desired gradation characteristic can be achieved.

The former LUT 31 rewrites an output gradation (output value) corresponding to each input gradation with a correction amount (e.g., output gradation, output value) calculated by the correction-amount calculating unit 12 of the control unit 10. With this arrangement, an adjustment (calibration) of a gradation characteristic (gradation characteristic of the former gamma γ1) expressed by the former LUT 31 can be performed.

The color-space converting unit 32 performs a color adjustment (calibration) of color temperatures and color coordinates to an output value (output gradation) output from the former LUT 31, by emphasizing or weakening a specific color component based on a 3×3 matrix configured by conversion coefficients corresponding to R, G, and B components, for example, and outputs an adjusted output gradation (output value) to the latter LUT 33.

The latter LUT 33 includes an LUT corresponding to each of R (red), G (green), B (blue), for example, corrects an output gradation to achieve a smooth gradation expression such that a gradation characteristic different for each liquid crystal panel 41 becomes an ideal gamma value (latter gamma, 2.2, for example), and outputs a corrected output gradation (correction signal) to the panel driving unit 40.

Although two correction tables of the former LUT 31 and the latter LUT 33 are included in the example shown in FIG. 1, these correction tables can be also combined into one correction table.

The panel driving unit 40 includes a gate driver, a source driver, and the like, and drives the liquid crystal panel 41 based on a signal input from the latter LUT 33 under the control of the control unit 10. With this arrangement, the control unit 10 can express a video image by adjusting a transmission factor of the liquid crystal panel 41 with an output gradation related to an input gradation of a video signal that is output from the PC 200.

The liquid crystal panel 41 has a pair of glass substrates arranged opposed to each other, and has a liquid crystal layer as a liquid crystal substance formed within a gap between the pair of glass substrates. One glass substrate is provided with a plurality of pixel electrodes and TFTs of which drains are connected to respective pixel electrodes. The other glass substrate is provided with a common electrode. Gates and sources of the TFTs are sequentially connected to output stages of gate drivers and source drivers, respectively. The liquid crystal panel 41 is sandwiched by a pair of polarization plates, and the backlight 43 is arranged on a back surface of the liquid crystal panel 41.

The optical sensor 44 includes, for example, three sensors having approximately the same sensitivity as spectral sensitivity corresponding to human eyes, can measure three values of X, Y, Z called a tristimulus value, and outputs measurement values to the control unit 10. The optical sensor 44 is not limited to that of a stimulus value direct-reading system but can be of a spectrophotometric colorimetry system. The optical sensor 44 can measure a color tone of the liquid crystal panel 41.

The optical sensor 44 is a built-in type, and has a light receiving surface provided to face a display surface of the liquid crystal panel 41 at one end of a tabular case (not shown) of a suitable length. The other end of the tabular case is held rotatably by about 45 degrees along the display surface around a rotation axis provided on an upper bezel part (not shown) of the liquid crystal panel 41. The optical sensor 44 is oppositely arranged on a peripheral part of the display surface from the bezel part based on driving of a DC motor (not shown), when measuring a color tone, and is accommodated inside the bezel part by being shifted from the display surface, when not measuring a color tone. The optical sensor 44 may be externally installed without being limited to a built-in type. For example, the optical sensor 44 may be brought into close contact with a corner of the display device 100, or can be a type of being fitted to a cabinet.

The human sensor 46 is provided at a suitable position of the display device 100, and senses a person (operator, for example) around the display device 100. The human sensor 46 outputs a sense signal to the control unit 10 when a person is sensed, and outputs a non-sense signal to the control unit 10, when a person is absent.

The determining unit 13 determines establishment of a predetermined first condition and a predetermined second condition. An operator can set the first condition and the second condition through the operating unit 202 of the PC 200. The first condition is a condition that the operator is absent, and can be a performance condition that indicates a timing of performing correction (calibration) of brightness and a color tone. The second condition is a condition that the operator is present, for example, and color space information (e.g., ICC profile) can be generated based on a measurement value after calibration (corrected measurement value) that is performed when the operator is absent.

FIG. 2 is an explanatory diagram showing an example of an absence condition and a presence condition of the operator. As shown in FIG. 2, the absence condition of the operator as the first condition is when the human sensor 46 senses absence (does not sense presence) of a person, when the PC 200 is turned off, when a monitor of the display device 100 is turned off, and when there is no signal from the PC 200 during a predetermined time, for example. A predetermined first time point is a scheduled time to leave the office, a scheduled time to leave the room, and times of nonworking days such as Saturday and Sunday and public holidays. The time may be a time zone.

The presence condition of the operator as the second condition is when the human sensor 46 senses presence of a person, when the PC 200 is turned on, when a monitor of the display device 100 is turned on, and when there is a signal from the PC 200 after a state of no signal from the PC 200 continued for a predetermined time or more, for example. A predetermined second time point is a scheduled time to come to the office, a scheduled time to enter the room, and times of work days such as Monday. The time may be a time zone.

In the example shown in FIG. 2, the presence condition of the operator is when the human sensor 46 senses a person by relating to that the absence condition of the operator is when the human sensor 46 senses absence of a person. However, the absence condition and the presence condition of the operator can be arbitrarily selected from the description of FIG. 2. For example, the absence condition of the operator can be established when the human sensor 46 senses absence of a person, and the presence condition of the operator can be established when there is a signal from the PC 200 after the state of no signal from the PC 200 continued for a predetermined time or more.

Figure 3:
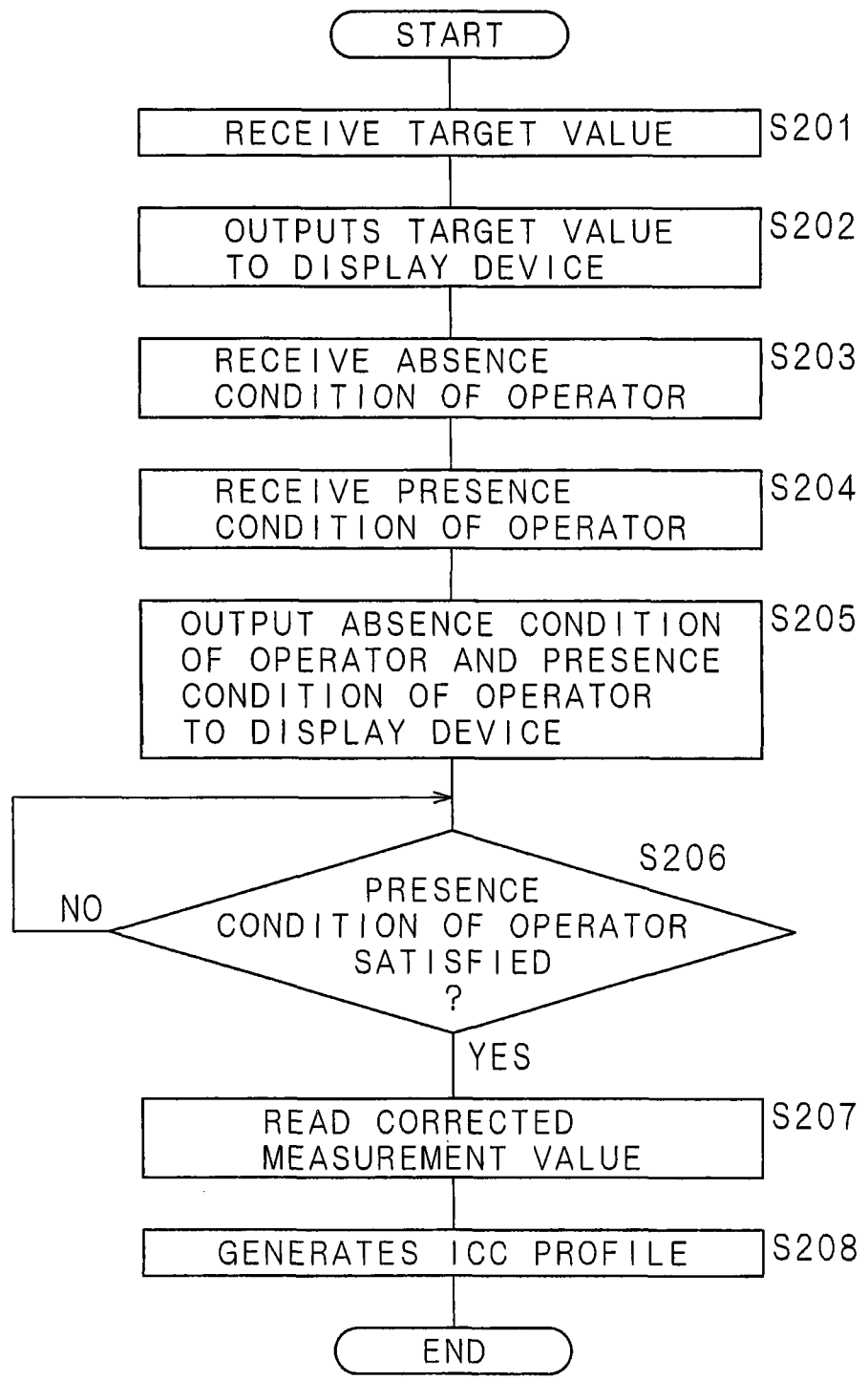
FIG. 3 is a flowchart showing a processing procedure of a PC.

Operation of the display system according to the present invention is described next. FIG. 3 is a flowchart showing a processing procedure of the PC 200. The CPU 201 receives a target value to perform calibration (correction) (S201), and outputs the received target value to the display device 100 (S202), through the operating unit 202. The display device 100 stores the target value as a target value 21 in the storage unit 20.

In performing calibration, a target value can be set for each item of brightness, a black level, a white point (gain, color temperatures, and color coordinates), and gamma (gradation) of red, green, blue, respectively, for example.

The CPU 201 receives the absence condition of the operator (S203), and receives the presence condition of the operator (S204), through the operating unit 202. The CPU 201 outputs the received absence condition of the operator and the received presence condition of the operator to the display device 100 (S205). The display device 100 can store these conditions in the storage unit 20.

In this state, the operator can move away from the PC 200 and the display device 100 to other location. When absence of the operator is detected, the display device 100 performs calibration described later, performs measurement of brightness and a color tone in a state after the calibration, and stores a measured result as the corrected measurement value 23 in the storage unit 20.

The CPU 201 determines whether the presence condition of the operator is satisfied (S206), and continues the process of step S206 when the presence condition is not satisfied (NO in S206). The CPU 201 can determine whether the presence condition of the operator is satisfied based on whether the operator performed any operation by the operating unit 202, or a result of determination by the display device 100 may be obtained, for example.

When the presence condition of the operator is satisfied (YES in S206), that is, when the operator is back around the PC 200 or the display device 100, the CPU 201 reads the corrected measurement value stored in the storage unit 20 by the display device 100 during the absence of the operator (S207), generates an ICC profile by using the read corrected measurement value (S208), and ends the process.

Figure 4:
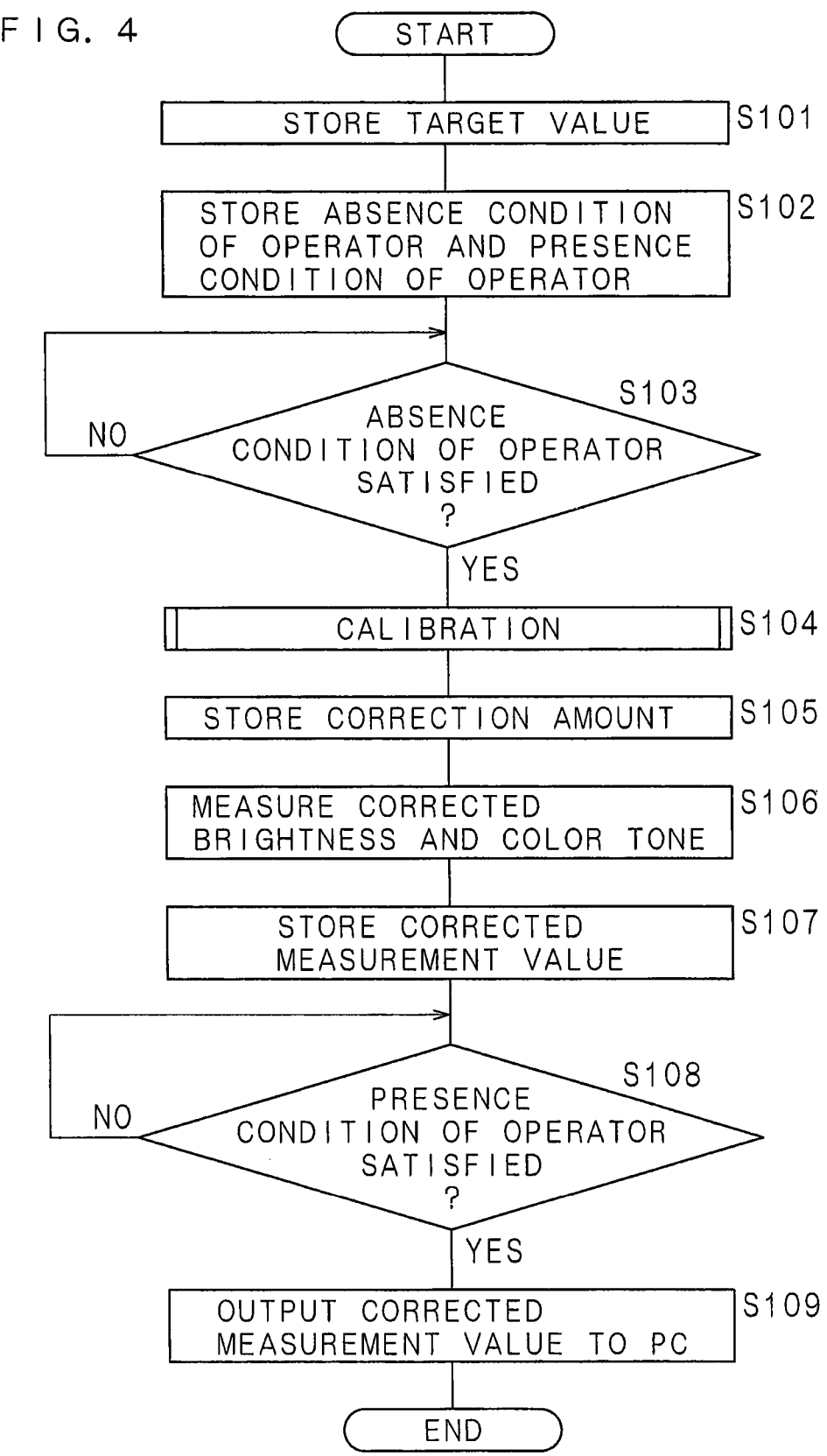
FIG. 4 is a flowchart showing a processing procedure of a display device.

FIG. 4 is a flowchart showing a processing procedure of the display device 100. The control unit 10 stores the target value output from the PC 200 in the storage unit 20 (S101), and stores the absence condition of the operator and the presence condition of the operator which are output from the PC 200 in the storage unit 20 (S102).

The control unit 10 determines whether the absence condition of the operator is satisfied (S103), and continues the process of step S103 when the absence condition is not satisfied (NO in S103). When the absence condition of the operator is satisfied (YES in S103), the control unit 10 performs calibration (S104). Calibration is performed to a whole or a part of brightness, a white point (gain), gamma (gradation), and primary colors (red, blue, and green colors). Details of a calibration process will be described later.

The control unit 10 stores the calibrated correction amount (adjustment result) 22 in the storage unit 20 (S105), measures the corrected (calibrated) brightness and color tone by using the optical sensor 44 (S106), and stores the measured final measurement result as the corrected measurement value 23 in the storage unit 20 (S107).

The control unit 10 determines whether the presence condition of the operator is satisfied (S108). When the presence condition of the operator is not satisfied (NO in S108), the process of step S108 is continued. When the presence condition of the operator is satisfied (YES in S108), that is, when the operator is back around the PC 200 or the display device 100, the control unit 10 outputs the corrected measurement value 23 to the PC 200 (S109), and ends the process. A power supply of the display device 100 can be turned off at the end of the process.

Figure 5:
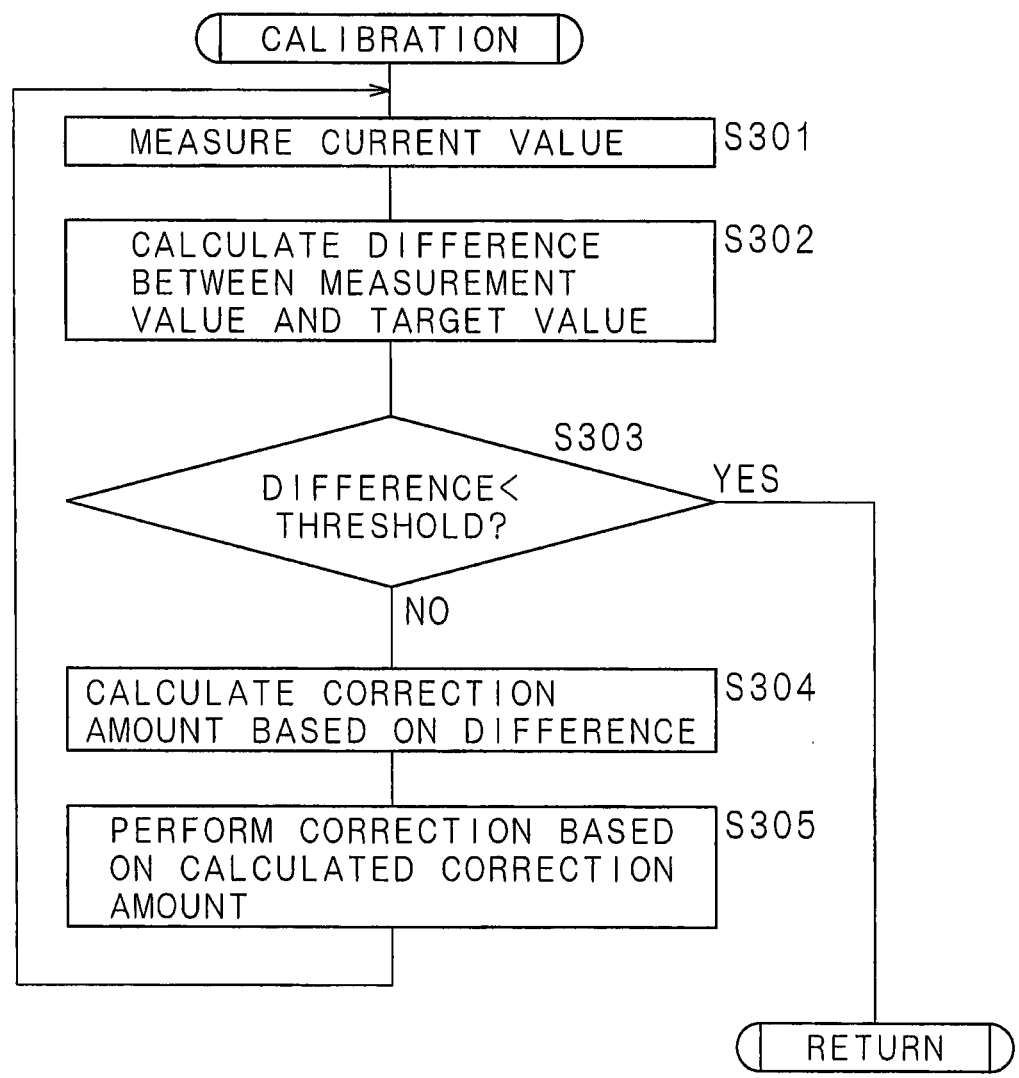
FIG. 5 is a flowchart showing a processing procedure of calibration.

FIG. 5 is a flowchart showing a processing procedure of calibration. The control unit 10 measures a current value (S301). The current value is a whole or a part of brightness, a white point (gain), gamma (gradation), and primary colors (red, blue, and green colors), for example, and can be measured by using the optical sensor 44. That is, the process of FIG. 5 is performed separately for each item.

The control unit 10 calculates a difference between a measurement value and a target value by the difference calculating unit 11 (S302), and determines whether the calculated difference is smaller than a predetermined threshold value (S303). When the difference is not smaller than the threshold value (NO in S303), the control unit 10 calculates a correction amount based on the difference (S304). The correction amount is information for adjusting a control signal to be output to the backlight driving unit 42 to bring the current brightness close to the target value, when the measurement item is brightness, for example. The correction amount is also information for adjusting an output gradation (output value) to be output from the former LUT 31, when the measurement item is gamma, for example.

The control unit 10 performs correction based on a calculated correction amount (S305), and continues the process of step S301 and thereafter. When the difference is smaller than the threshold value (YES in S303), the control unit 10 ends the process.

As described above, in the first embodiment, correction (calibration) can be performed when the operator is absent, by determining the condition that the operator is absent. Therefore, correction (calibration) not based on the presence of the operator can be performed, and a load of the operator can be reduced.

Calibration ends when a difference between a measurement value and a target value becomes smaller than a threshold value after continuing the correction (calibration). Brightness and a color tone are measured in the corrected state, and the measured value is stored as the corrected measurement value. With this arrangement, data necessary for generating color space information such as an ICC profile can be obtained in advance when the operator is absent.

When the operator is present based on determination of the presence condition of the operator, color space information (ICC profile, for example) can be generated based on a measurement value after calibration that is performed during the absence of the operator.

Absence of the operator can be determined when the human sensor 46 does not sense a person. Presence of the operator can be determined when the human sensor 46 senses a person. As a result, calibration can be performed and the calibrated measurement value can be stored, when the operator is absent. An ICC profile can be generated by using the calibrated data, when the operator is present.

Absence or presence of the operator is determined based on a signal from the PC 200. As a result, absence of the operator can be determined when the operator is not operating the PC 200, and presence of the operator can be determined when the operator operates the PC 200. As a result, calibration can be performed and the calibrated measurement value can be stored, when the operator is absent. An ICC profile can be generated by using the calibrated data, when the operator is present.

By setting a predetermined time point, absence of the operator can be determined at a scheduled time to leave the office or at a scheduled time to leave the room, and presence of the operator can be determined at a scheduled time to come to the office or at a scheduled time to enter the room. As a result, calibration can be performed and the calibrated measurement value can be stored, when the operator is absent. An ICC profile can be generated by using the calibrated data, when the operator is present.

When the operator set the absence condition of the operator and the presence condition of the operator by the PC 200, the operator can determine timings of performing calibration, storing the calibrated measurement value, and generating an ICC profile by using the calibrated data, by matching the requirements of the operator. As a result, convenience of the operator is improved.

Second Embodiment

Figure 6:
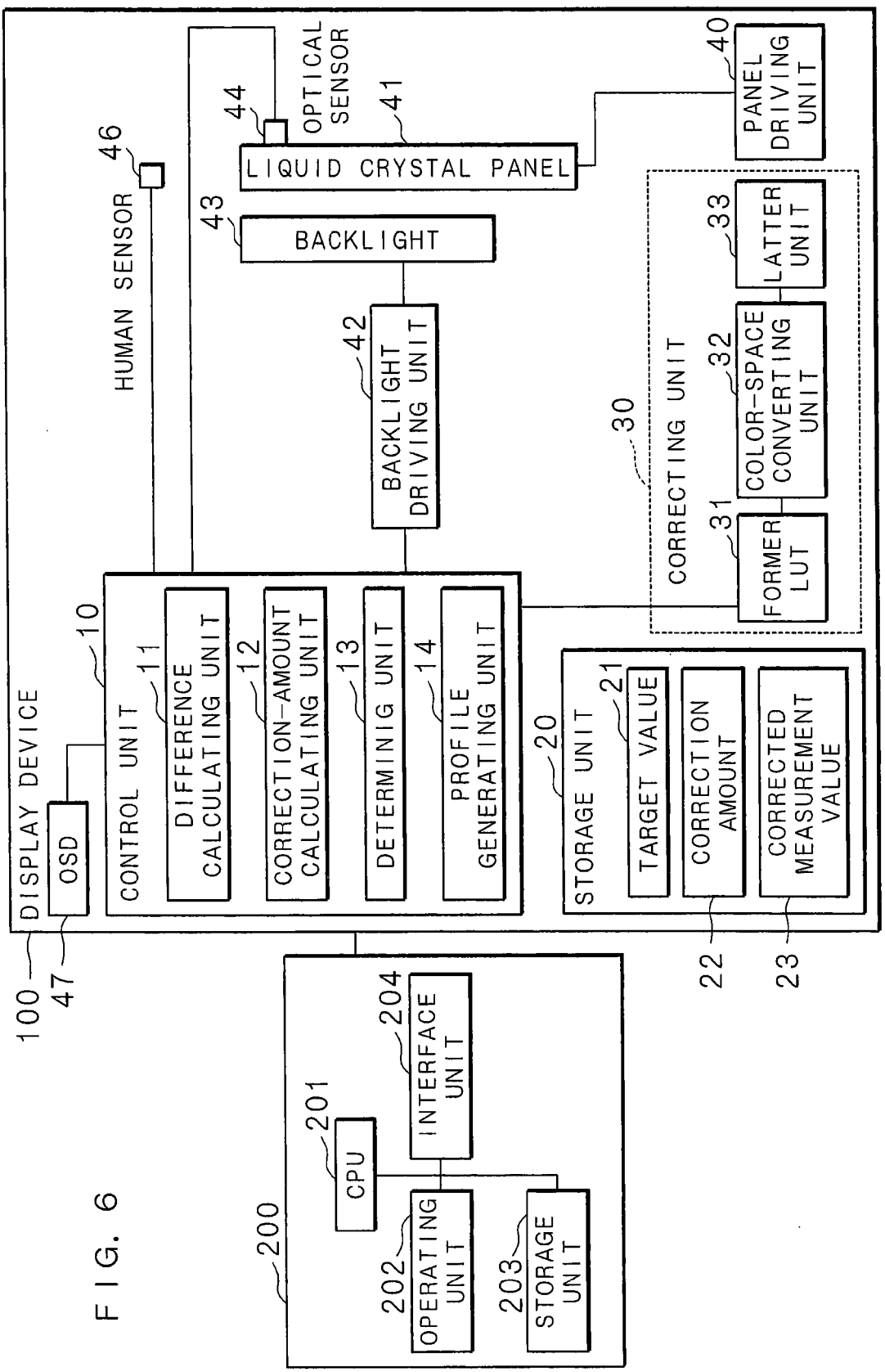
FIG. 6 is a block diagram showing an example of a configuration of a display system according to a second embodiment.

FIG. 6 is a block diagram showing an example of a configuration of a display system according to a second embodiment. The second embodiment is different from the first embodiment in that the profile generating unit 205 provided in the PC 200 is omitted and a profile generating unit 14 is provided in the display device 100 instead, and that an OSD (onscreen display) 47 having a function similar to that of the operating unit 202 is provided in the display device 100.

The profile generating unit 14 generates color space information based on the corrected measurement value 23. The OSD 47 can set a target value of calibration and an absence condition of the operator. Other portions are similar to those of the first embodiment, and therefore, are denoted with the same reference numerals and descriptions thereof are omitted.

Figure 7:
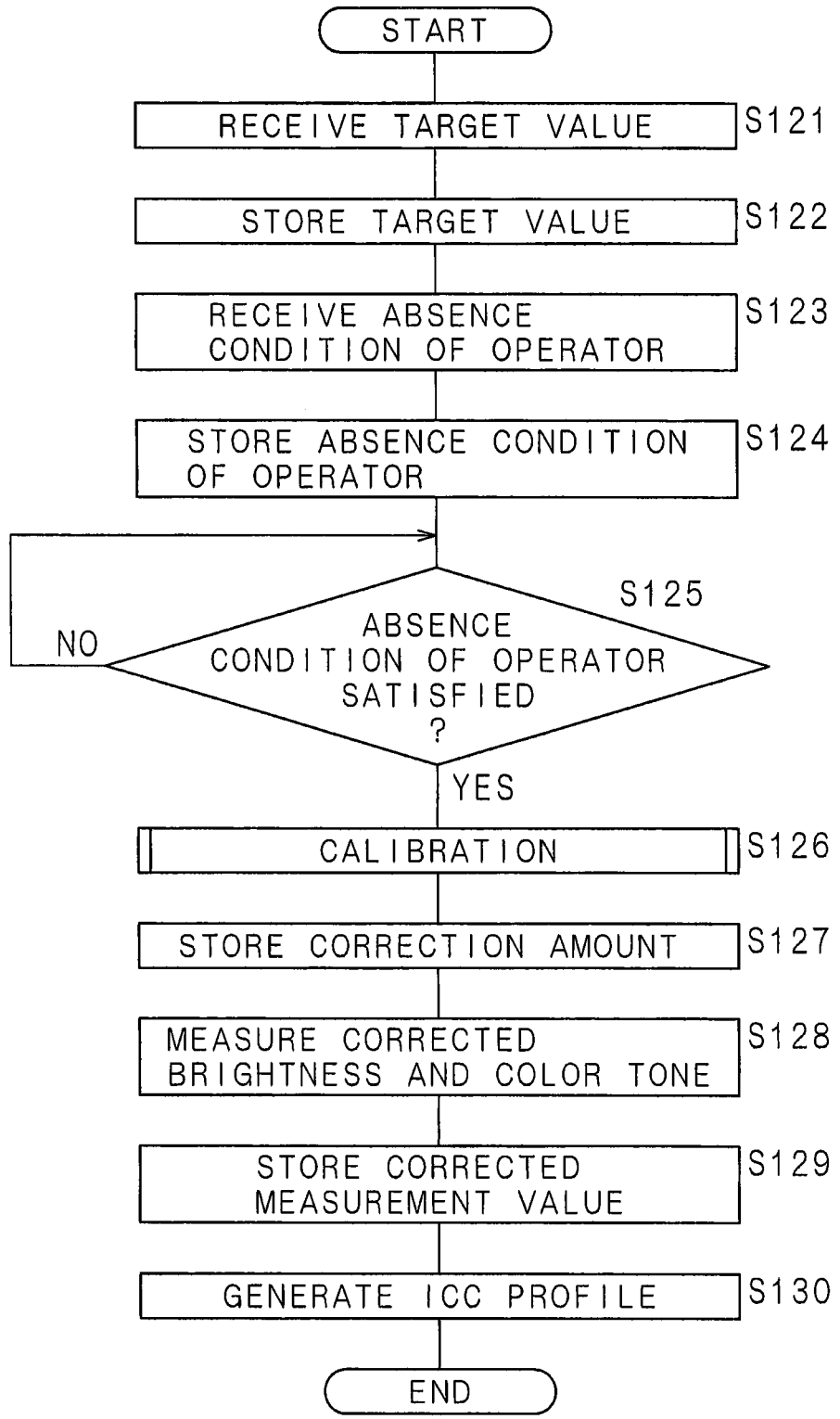
FIG. 7 is a flowchart showing a processing procedure of a display device according to the second embodiment.

FIG. 7 is a flowchart showing a processing procedure of the display device 100 according to the second embodiment. The control unit 10 receives a target value by the OSD 47 (S121), and stores the received target value in the storage unit 20 (S122). The control unit 10 receives an absence condition of the operator by the OSD 47 (S123), and stores the received absence condition of the operator in the storage unit 20 (S124).

The control unit 10 determines whether the absence condition of the operator is satisfied (S125), and continues the process of step S125 when the absence condition is not satisfied (NO in S125). When the absence condition of the operator is satisfied (YES in S125), the control unit 10 performs calibration (S126). Calibration is performed to a whole or a part of brightness, a white point (gain), gamma (gradation), and primary colors (red, blue, and green colors). A process of calibration is similar to that of the process in FIG. 5.

The control unit 10 stores the calibrated correction amount (calibration result) 22 in the storage unit 20 (S127), measures the (corrected) calibrated brightness and color tone by using the optical sensor 44 (S128), and stores a measured final measurement result as the corrected measurement value 23 in the storage unit 20 (S129).

The control unit 10 generates an ICC profile by using the corrected measurement value (S130), and ends the process. A power supply of the display device 100 can be turned off at the end of the process.

As described above, in the second embodiment, correction (calibration) can be performed when the operator is absent by determining a condition that the operator is absent. Therefore, correction (calibration) not based on presence of the operator can be performed to generate color space information, and a load of the operator can be reduced.

Correction (calibration) ends when a difference between a measurement value and a target value becomes smaller than a threshold value after continuing correction (calibration). Brightness and a color tone are measured in a state after correction, and a measured value is stored as a corrected measurement value. With this arrangement, data necessary to generate color space information such as an ICC profile can be obtained in advance when the operator is absent.

Absence of the operator can be determined when the human sensor 46 does not sense a person. Calibration can be performed and the calibrated measurement value can be stored, when the operator is absent. An ICC profile can be generated by using the calibrated data, when the operator is absent.

Absence of the operator is determined based on a signal from the PC 200. As a result, absence of the operator can be determined when the operator is not operating the PC 200, whereby calibration can be performed and the calibrated measurement value can be stored, when the operator is absent. An ICC profile can be generated by using the calibrated data.

By setting a predetermined time point, absence of the operator can be determined at a scheduled time to leave the office or at a scheduled time to leave the room, and calibration can be performed and the calibrated measurement value can be stored, when the operator is absent. An ICC profile can be generated by using the calibrated data.

When the operator sets the absence condition of the operator by the display unit 100, the operator can determine timings of performing calibration, storing the calibrated measurement value, and generating an ICC profile by using the calibrated data, by matching the requirements of the operator. As a result, convenience of the operator is improved.

Third Embodiment

Figure 8:
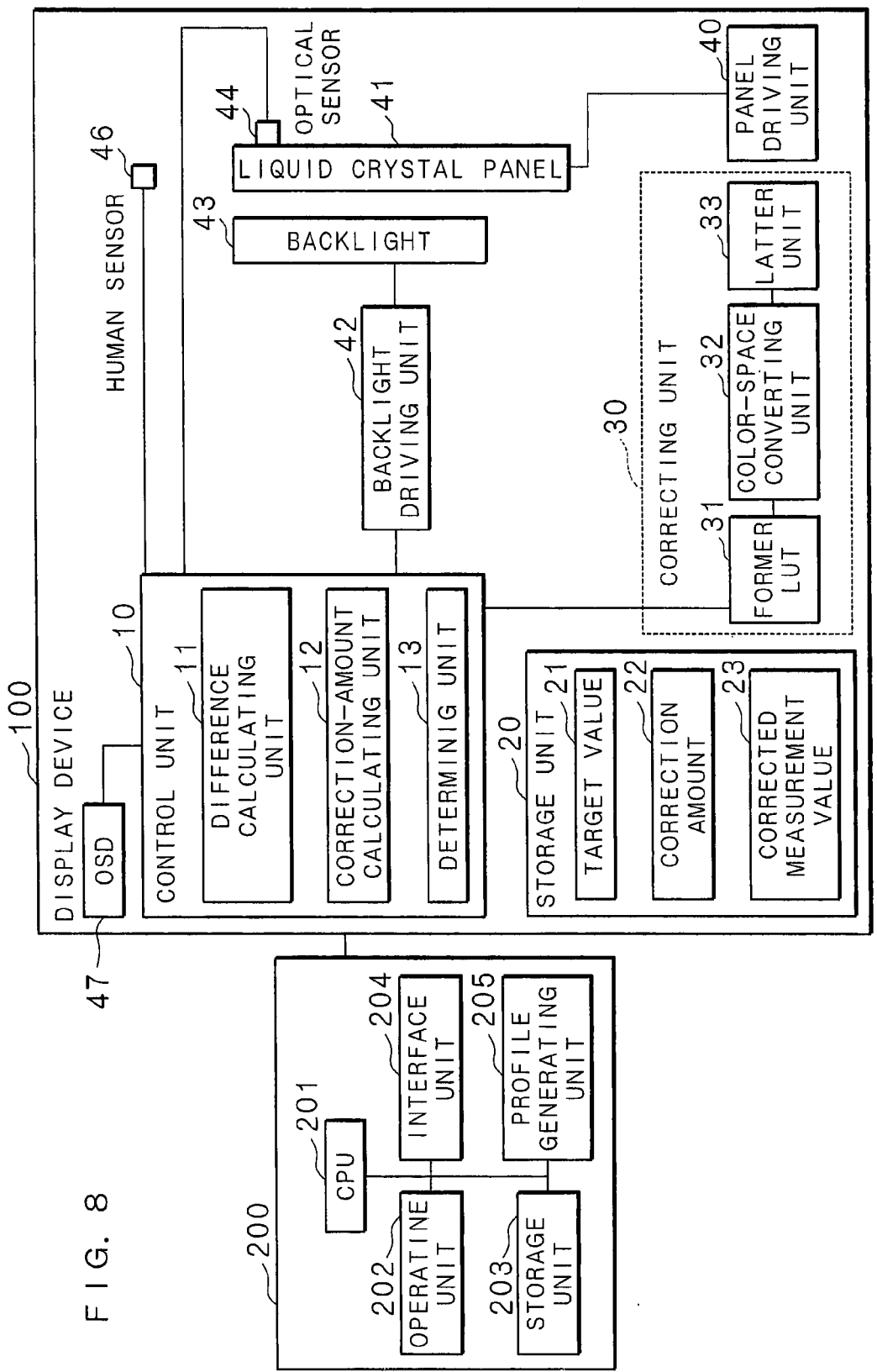
FIG. 8 is a block diagram showing an example of a configuration of a display system according to a third embodiment.

FIG. 8 is a block diagram showing an example of a configuration of a display system according to a third embodiment. The third embodiment is different from the first embodiment in that the OSD (onscreen display) 47 having a function similar to that of the operating unit 202 is provided in the display device 100.

The OSD 47 can set a target value of calibration, an absence condition of the operator, and a presence condition of the operator. Other portions are similar to those of the first embodiment, and therefore, are denoted with the same reference numerals and descriptions thereof are omitted.

Figure 9:
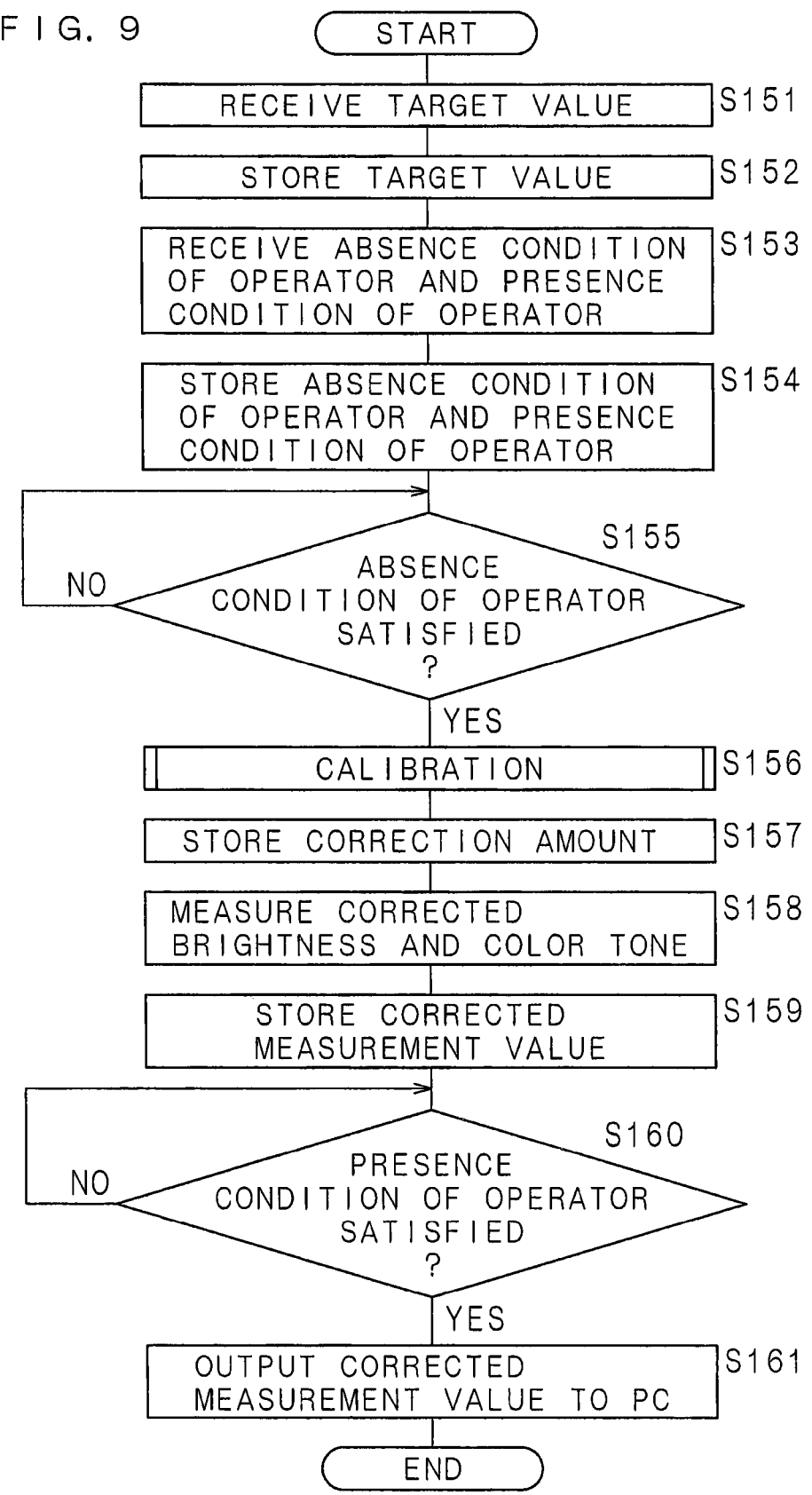
FIG. 9 is a flowchart showing a processing procedure of a display device according to the third embodiment.

FIG. 9 is a flowchart showing a processing procedure of the display device 100 according to the third embodiment. The control unit 10 receives a target value by the OSD 47 (S151), and stores the received target value in the storage unit 20 (S152). The control unit 10 receives an absence condition of the operator and a presence condition of the operator by the OSD 47 (S153), and stores the received absence condition of the operator and presence condition of the operator in the storage unit 20 (S154).

The control unit 10 determines whether the absence condition of the operator is satisfied (S155), and continues the process of step S155 when the absence condition is not satisfied (NO in S155). When the absence condition of the operator is satisfied (YES in S155), the control unit 10 performs calibration (S156). Calibration is performed to a whole or a part of brightness, a white point (gain), gamma (gradation), and primary colors (red, blue, and green colors). A process of calibration is similar to that of the process in FIG. 5.

The control unit 10 stores the calibrated correction amount (adjustment result) 22 in the storage unit 20 (S157), measures the corrected (calibrated) brightness and color tone by using the optical sensor 44 (S158), and stores the measured final measurement result as the corrected measurement value 23 in the storage unit 20 (S159).

The control unit 10 determines whether the presence condition of the operator is satisfied (S160). When the presence condition of the operator is not satisfied (NO in S160), the process of step S160 is continued. When the presence condition of the operator is satisfied (YES in S160), that is, when the operator is back around the PC 200 or the display device 100, the control unit 10 outputs the corrected measurement value 23 to the PC 200 (S161), and ends the process. A power supply of the display device 100 can be turned off at the end of the process.

Figure 10:
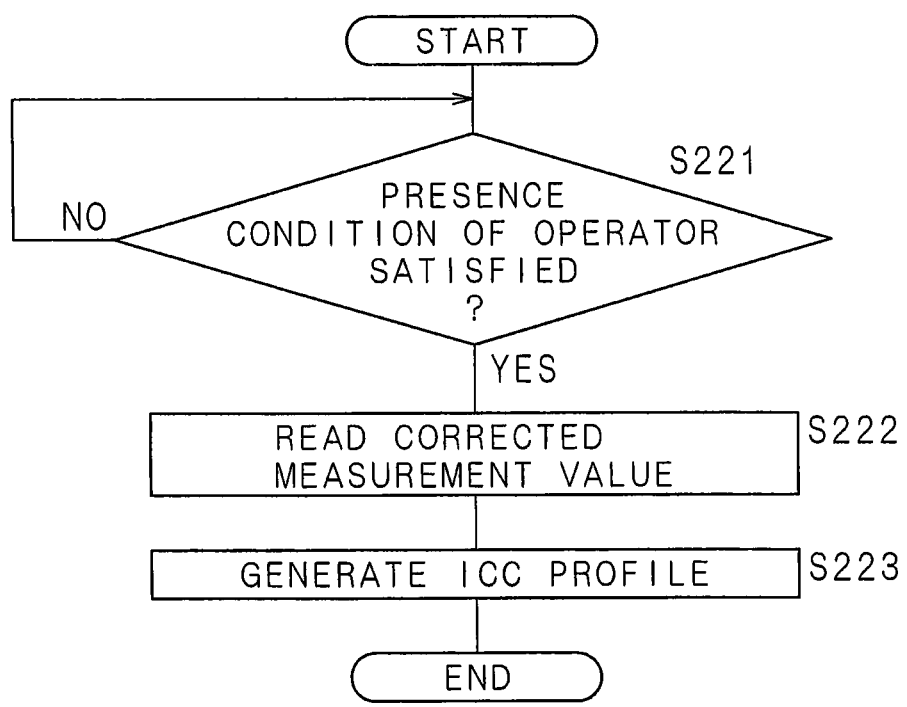
FIG. 10 is a flowchart showing a processing procedure of a PC according to the third embodiment.

FIG. 10 is a flowchart showing a processing procedure of the PC 200 according to the third embodiment. The CPU 201 determines whether the presence condition of the operator is satisfied (S221), and continues the process of step S221 when the presence condition is not satisfied (NO in S221). The CPU 201 can determine whether the presence condition of the operator is satisfied based on whether the operator performed any operation by the operating unit 202, or based on a result of determination by the display device 100, for example.

When the presence condition of the operator is satisfied (YES in S221), that is, when the operator is back around the PC 200 or the display device 100, the CPU 201 reads the corrected measurement value 23 stored in the storage unit 20 by the display device 100 during the absence of the operator (S222), generates an ICC profile by using the read corrected measurement value 23 (S223), and ends the process.

As described above, in the third embodiment, correction (calibration) can be performed when the operator is absent, by determining the condition that the operator is absent. Therefore, correction (calibration) not based on presence of the operator can be performed, and a load of the operator can be reduced.

Correction (calibration) ends when a difference between a measurement value and a target value becomes smaller than a threshold value after continuing the correction (calibration). Brightness and a color tone are measured in a state after correction, and a measured value is stored as a corrected measurement value. With this arrangement, data necessary for generating color space information such as an ICC profile can be obtained in advance when the operator is absent.

When the operator is present based on determination of the presence condition of the operator, color space information (e.g., ICC profile) can be generated based on a measurement value after calibration that is performed during the absence of the operator.

Absence of the operator can be determined when the human sensor 46 does not sense a person. Presence of the operator can be determined when the human sensor 46 senses a person. As a result, calibration can be performed and the calibrated measurement value can be stored, when the operator is absent. An ICC profile can be generated by using the calibrated data, when the operator is present.

Absence or presence of the operator is determined based on a signal from the PC 200. As a result, absence of the operator can be determined when the operator is not operating the PC 200, and presence of the operator can be determined when the operator operates the PC 200. As a result, calibration can be performed and the calibrated measurement value can be stored, when the operator is absent. An ICC profile can be generated by using the calibrated data, when the operator is present.

By setting a predetermined time point, absence of the operator can be determined at a scheduled time to leave the office or at a scheduled time to leave the room, and presence of the operator can be determined at a scheduled time to come to the office or at a scheduled time to enter the room. As a result, calibration can be performed and the calibrated measurement value can be stored, when the operator is absent. An ICC profile can be generated by using the calibrated data, when operator is present.

When the operator sets the absence condition of the operator and the presence condition of the operator by the display device 100, the operator can determine timings of performing calibration, storing the calibrated measurement value, and generating an ICC profile by using the calibrated data, by matching the requirements of the operator. As a result, convenience of the operator is improved.

Fourth Embodiment

Figure 11:
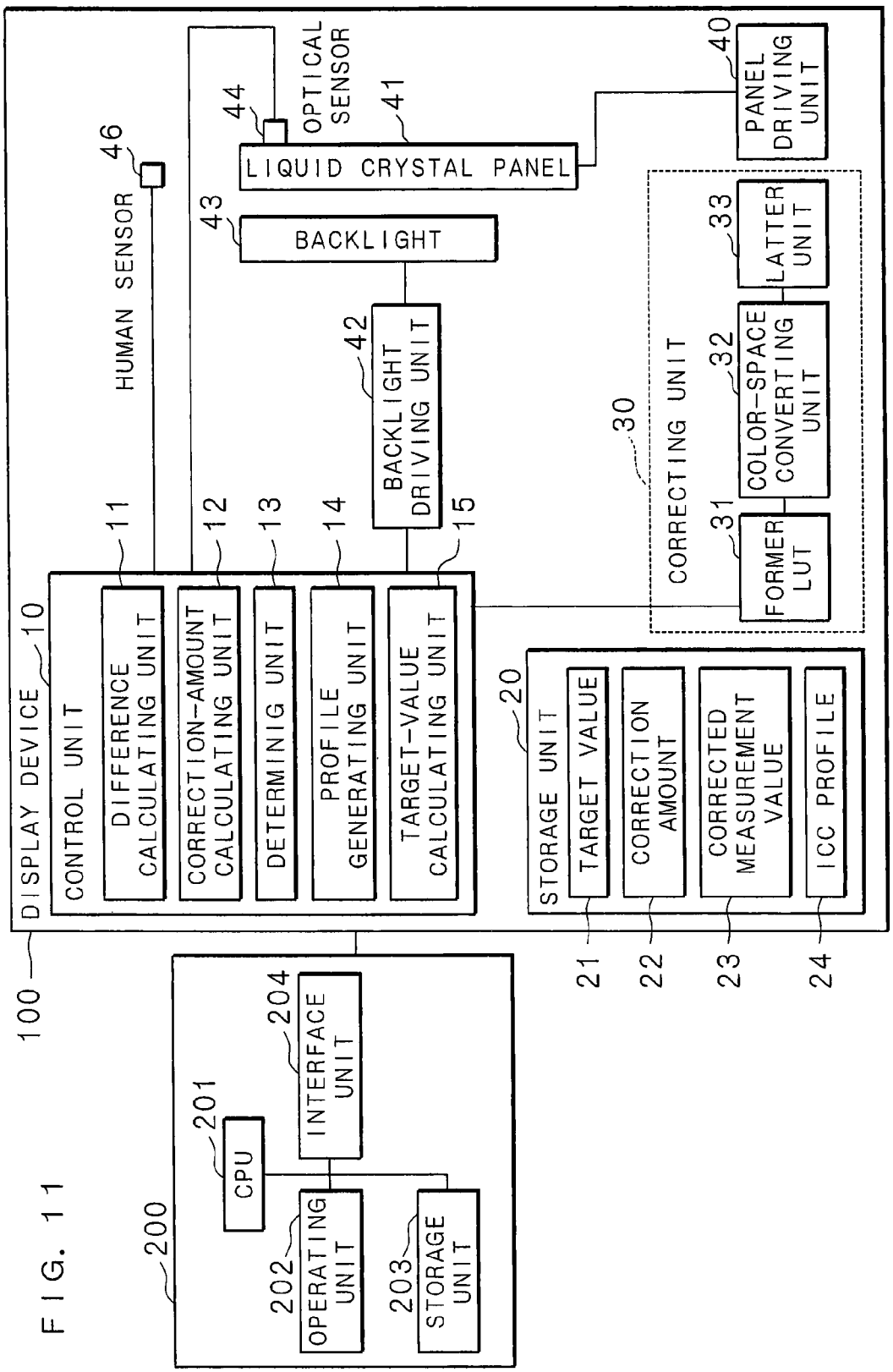
FIG. 11 is a block diagram showing an example of a configuration of a display system according to a fourth embodiment.

FIG. 11 is a block diagram showing an example of a configuration of a display system according to a fourth embodiment. The fourth embodiment is different from the first to third embodiments in that a target-value calculating unit 15 is provided. The storage unit 20 stores an ICC profile 24. It is not essential that the ICC profile 24 is stored in the storage unit 20, and the ICC profile 24 can be also obtained from an external device such as the PC 200. The ICC profile 24 may be for the display device 100 or may be for a printer (not shown) or the like connected to the PC 200.

The target-value calculating unit 15 calculates a target value from the ICC profile 24 generated by the profile generating unit 14 or from an ICC profile generated by other external devices such as the PC 200. A target value calculated by the target-value calculating unit 15 can be stored in the storage unit 20 as the target value 21.

FIG. 12 is an explanatory diagram showing an example of the ICC profile 24. The ICC profile 24 contains header information, tag information (tag table), and the like. In the example of FIG. 12, the tag table includes a tag name, offset, and size. Here, rXYZ, gXYZ, bXYZ represent an XYZ value of red, an XYZ value of green, and an XYZ value of blue, respectively. Target values of color coordinate values, R(X, Y, Z), G(X, Y, Z), B(X, Y, Z), and the like can be calculated from these tags.

In this case, rTRC, gTRC, bTRC represent a tone curve of red, a tone curve of green, and a tone curve of blue, respectively, and target values of gamma can be calculated from these curves.

In this case, wpt represents an XYZ value of a white point, and a target value of the white point can be calculated from wpt.

Next, a method of calculating a target value will be described. An example of calculating a standardized tristimulus value is described below. As shown in FIG. 12, when the chad tag is present in the ICC profile 24, the ICC profile 24 has the white point of PCS (Profile Connection Space) as D50. That is, a measurement value is converted from a standardized tristimulus value when the measured white is a white point into a standardized tristimulus value when D50 is a white point, and stores the result of conversion in the ICC profile 24.

FIG. 13 is an explanatory diagram showing an example of a standardized tristimulus value when D50 is a white point. As shown in FIG. 13, an XYZ value is stored in the ICC profile 24.

When a profile is actually used, an actual tristimulus value needs to be used. A 3×3 matrix of the chad tag is used to obtain the actual tristimulus value.

FIG. 14A and FIG. 14B are explanatory diagrams showing examples of a matrix shown in the chad tag. FIG. 14A shows a matrix of the chad tag, and FIG. 14B shows an inverse matrix of the chad tag. A matrix shown in the chad tag works to combine a tristimulus value based on the measured white and a tristimulus value when D50 is a white point. That is, the matrix of the chad tag expresses conversion from an actual measurement value into a tristimulus value when D50 is a white point, and the inverse matrix of the chad tag expresses conversion from a tristimulus value when D50 is a white point into an actual measurement value. Therefore, to obtain an actual chromaticity value from a value of rXYZ and the like in the ICC profile 24, the inverse matrix of the chad tag is worked on the tristimulus value shown in FIG. 13.

FIG. 15 is an explanatory diagram showing an example of a standardized tristimulus value when a tristimulus value in the wtpt tag is a white point. The example of FIG. 15 corresponds to the example of FIG. 13.

Figure 16:
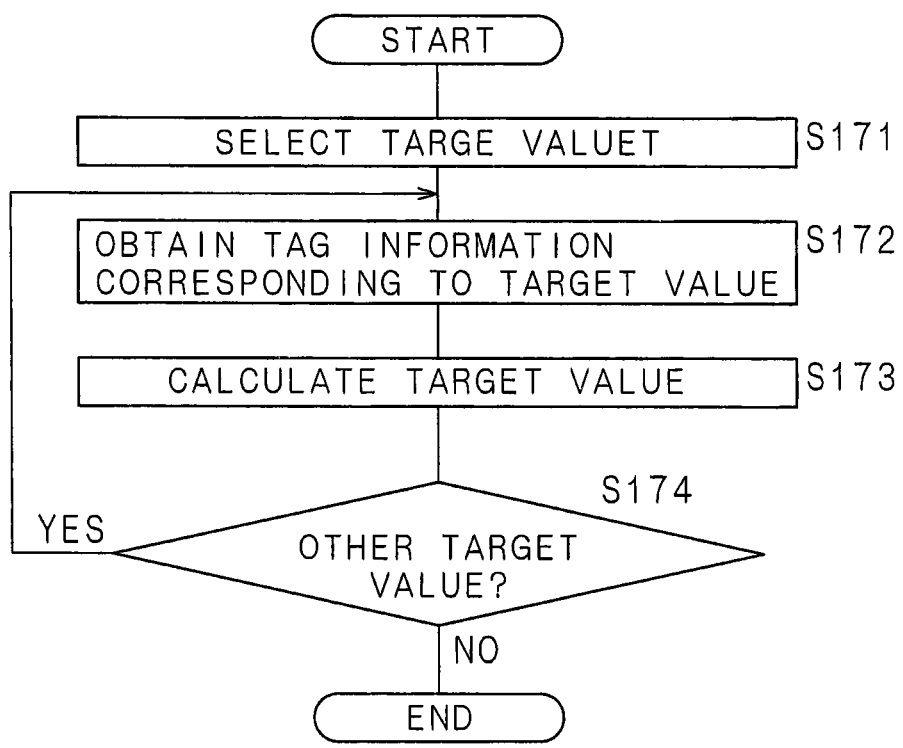
FIG. 16 is a flowchart showing a processing procedure of target value calculation.

FIG. 16 is a flowchart showing a processing procedure of a target value calculation. The control unit 10 selects a target value (S171), and obtains tag information of the ICC profile 24 corresponding to the selected target value (S172). The control unit 10 calculates the target value by using the obtained tag information (S173).

The control unit 10 determines whether there are other target values to be calculated (S174). When there are other target values to be calculated (YES in S174), the control unit 10 continues the process of step S172 and thereafter, and ends the process when there is no other target value to be calculated (NO in S174).

As described above, a target value can be obtained from existing color space information by calculating a predetermined target value from color space information such as the ICC profile 24. Therefore, the operator is not required to perform an input operation to set a target value. Colors of other display devices and other systems can be reproduced by emulation. Further, a state of a display device (display unit) can be always maintained in a state corresponding to color space information, based on the target value obtained from the color space information.

As described above, according to the present invention, color space information can be generated from calibration not based on presence of the operator. A calibration operation does not become an obstructive factor of other operations of the operator, and a load of the operator can be reduced.

According to the present invention, the final measurement result after performing calibration is stored in the display device 100. Therefore, the operator can always generate an ICC profile, and is not required to perform calibration or measurement again to generate the ICC profile.

According to the present invention, the monitor (display device) does not need to be turned on and aged in advance only for the purpose of performing calibration. Therefore, a processing time of the system as a whole can be shortened and energy can be saved.

According to the present invention, calibration can be performed only by the display device 100, and the PC 200 does not need to be used. Therefore, power consumption for calibration can be reduced for the system as a whole. Further, by turning off the monitor (display device) after calibration has ended, power can be saved for the system as a whole.

According to the present invention, the operator can freely set a timing of performing calibration. As a result, convenience of the operator is improved.

According to the present invention, the target value can be obtained from existing color space information. Therefore, the operator is not required to perform an input operation to set the target value. Colors of other display devices and other systems can be reproduced by emulation. Further, a state of the display device (display unit) can be always maintained in a state corresponding to color space information, based on the target value obtained from the color space information.

In the above embodiments, although the latter lookup table is used to correct a gradation characteristic intrinsic to the display unit such as a liquid crystal panel, it can be configured such that only the former lookup table is used without using the latter lookup table, as long as a gradation characteristic of the display unit itself has a small variation and the gradation characteristic is ideal.

In the above embodiments, although the liquid crystal panel is used for the display unit of the display device, the display unit is not limited to the liquid crystal panel, and the present invention can be also applied to other display devices such as a CRT and a PDP.

In the above embodiments, although a case where the input gradation is 256 gradations is described, the gradation number is not limited to 256, and other gradation numbers can be also used. A suitable required value can be also used for the bit number of the former LUT and the latter LUT.

In the above embodiments, the control unit 10 can be also configured by exclusive hardware, or by a CPU, a RAM, a ROM, and the like. When a computer program that describes the processing procedures shown in FIGS. 4, 5, 7, and 9 is executed by the CPU, a function similar to that of the hardware can be achieved. The above computer program can be also stored in a computer-readable recording medium.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A display device connected with a color space information generating device which is separated from and independent of the display device, the display device comprising:
   a display unit; and
   a correcting unit that corrects brightness or a color tone of the display unit, the display device further comprising:
   a measuring unit that measures the brightness or the color tone of the display unit;
   a difference calculating unit that calculates a difference between a measurement value measured by the measuring unit and a predetermined target value;
   a correction-amount calculating unit that calculates a correction amount to correct the brightness or the color tone of the display unit based on the difference calculated by the difference calculating unit;
   a first determining unit that determines establishment of a condition that an operator is absent; and
   a second determining unit that determines establishment of a condition that the operator is present, wherein
   the correcting unit corrects the brightness or the color tone by using the correction amount calculated by the correction-amount calculating unit when the first determining unit determines that the condition that the operator is absent is established, and
   the display device further comprises
   a storage unit that stores a corrected measurement value of the brightness or the color tone measured by the measuring unit after the correcting unit corrects the brightness or the color tone; and
   an output unit that outputs, according to reading from the color space information generating device, the corrected measurement value stored in the storage unit to the color space information generating device that generates color space information concerning color management for achieving reproducibility of colors based on the corrected measurement value, when the second determining unit determines that the condition that the operator is present is established.

2. The display device according to claim 1, comprising a target value calculating unit that calculates the target value from arbitrary color space information concerning the color management for achieving the reproducibility of colors.

3. The display device according to claim 1, further comprising a human sensor, wherein
   the first determining unit is configured to determine that the condition that the operator is absent is established when the human sensor does not sense a person, and the second determining unit is configured to determine that the condition that the operator is present is established when the human sensor senses a person.

4. The display device according to claim 2, further comprising a human sensor, wherein
the first determining unit is configured to determine that the condition that the operator is absent is established when the human sensor does not sense a person, and
the second determining unit is configured to determine that the condition that the operator is present is established when the human sensor senses a person.

5. The display device according to claim 1, further comprising an obtaining unit that obtains a predetermined signal from the external device, wherein
the first determining unit is configured to determine that the condition that the operator is absent is established when the obtaining unit does not obtain a predetermined signal, and
the second determining unit is configured to determine that the condition that the operator is present is established when the obtaining unit obtains a predetermined signal.

6. The display device according to claim 2, further comprising an obtaining unit that obtains a predetermined signal from the external device, wherein
the first determining unit is configured to determine that the condition that the operator is absent is established when the obtaining unit does not obtain a predetermined signal, and
the second determining unit is configured to determine that the condition that the operator is present is established when the obtaining unit obtains a predetermined signal.

7. The display device according to claim 1, further comprising a timing unit, wherein
the first determining unit is configured to determine that the condition that the operator is absent is established when time is a predetermined first time point, and
the second determining unit is configured to determine that the condition that the operator is present is established when time is a predetermined second time point.

8. The display device according to claim 2, further comprising a timing unit, wherein
the first determining unit is configured to determine that the condition that the operator is absent is established when time is a predetermined first time point, and
the second determining unit is configured to determine that the condition that the operator is present is established when time is a predetermined second time point.

9. A display system comprising:
the display device according to claim 1; and
an external device that outputs predetermined data to the display device, wherein
the external device includes a generating unit that generates color space information concerning color management for achieving reproducibility of colors based on the corrected measurement value that is read, when the second determining unit of the display device determines that the condition that the operator is present is established.

10. A correction method for correcting brightness or a color tone of a display unit of a display device that includes the display unit connected with a color space information generating device which is separated from and independent of the display device, the method comprising:
determining establishment of a condition that an operator is absent by a first determining unit;
measuring the brightness or the color tone of the display unit by a measuring unit when determined that the condition that the operator is absent is established;
calculating a difference between a measured measurement value and a predetermined target value by a difference calculating unit;
calculating a correction amount to correct the brightness or the color tone of the display unit based on the calculated difference by a correction-amount calculating unit;
correcting the brightness or the color tone by using the calculated correction amount by a correcting unit;
storing, in a storing unit, a corrected measurement value of the brightness or the color tone measured by the measuring unit after correcting the brightness or the color tone by the correcting unit;
determining establishment of a condition that the operator is present by a second determining unit; and
according to reading from the color space information generating device, outputting the corrected measurement value stored in the storage unit to the color space information generating device that generates color space information concerning color management for achieving reproducibility of colors based on the corrected measurement value, when determined that the condition that the operator is present is established.

* * * * *